(12) United States Patent
Hugo

(10) Patent No.: US 6,594,593 B1
(45) Date of Patent: Jul. 15, 2003

(54) PERFORMANCE ASSESSMENT OF CONTROLLERS APPLIED TO INTEGRATING PROCESSES

(75) Inventor: Alan Hugo, Danville, CA (US)

(73) Assignee: Alan J. Hugo, Danville, CA (US)

( * ) Notice: Subject to any disclaimer, the term of this patent is extended or adjusted under 35 U.S.C. 154(b) by 412 days.

(21) Appl. No.: 09/595,981

(22) Filed: Jun. 16, 2000

(51) Int. Cl.$^7$ ............ G05B 13/02; G06F 19/00
(52) U.S. Cl. ............ 702/45; 700/32; 702/179
(58) Field of Search ............ 702/45, 179, 182; 700/1, 21, 32, 28

(56) References Cited

U.S. PATENT DOCUMENTS

| | | | |
|---|---|---|---|
| 5,796,606 A | | 8/1998 | Spring |
| 5,838,561 A | * | 11/1998 | Owen .................. 364/152 |
| 6,459,939 B1 | * | 10/2002 | Hugo ................... 700/44 |

OTHER PUBLICATIONS

Hugo, "Performance Assessment of DMC Controllers", IEEE, Jun. 1999.*
Swanda et al., "Controller Performance Assessment Based on Setpoint Response Data", IEEE, Jun. 1999.*
Panagopoulos et al., "Design of PiD Controllers Based on Constrained Optimization", IEEE, Jun. 1999.*
Hugo, "Process Controller Performance Monitoring and Assessment", Internet Web page of Control Arts, Inc., date unknown.*
Hugo, "Limitations of Model Predictive Controllers", Internet Web Page of Control Arts, Inc., date unknown.*
Desborough & Harris Cdn J. Chem Eng Performance Assessment for Univariate Feedback Controllers 70, 1992.
McDonald, McAvog, & Tits Optimal Averaging Level Control AIChEJ, 32, 1986.
Wang & Cluett IEE Proc—Control Tuning PID controllers for Integrating Processes Theory Appl, 144, No. 5, 1997.
Harris, Seppala, Desborough A review of performance monitoring & Assessment techniques for univariate & Multivariate control systems J. Proc Control 9 1999, pl–17.
U.S. patent application Ser. No. 09340531, Performance Assessment of Model Predictive Controllers, filed Jun. 29, 1999.
Desborough & Harris Performance Assessment for Univariate Feedback Controllers Cdn J. Chem Eng 70, 1992, p 1186–1197.
Harris, Seppala, Desborough A review of performance monitoring & assessment techniques for univariate & multivariate control system J. of Process Control 9, pp 1–17.
McDonald, McAvoy, Tits Optimal Averaging Level Control AIChEJ 32, p 75–86.

* cited by examiner

Primary Examiner—Patrick Assouad

(57) ABSTRACT

A method for determining the performance of controllers applied to integrating processes requiring only closed-loop data and equipment parameters. A numerical measure is calculated which is a comparison of the actual variation of the manipulated variable to the variation that would be expected if a controller which minimized the maximum rate of change of the manipulated variable while keeping the controlled variable within a specified range was used.

1 Claim, 3 Drawing Sheets

PERFORMANCE ASSESSMENT OF CONTROLLERS APPLIED TO INTEGRATING PROCESSES

CROSS-REFERENCE TO RELATED APPLICATIONS

Patents: Performance assessment of model predictive controllers, Ser. No. 09/1,340,531 (pending)

Performance assessment of non-deadtime compensated controllers, Ser. No. 09/501,129 (pending) Both these patent applications by Alan Hugo are for performance assessment of nonintegrating processes.

STATEMENT REGARDING FEDERALLY SPONSORED REASEARH AND DEVELOPMENT

N/A

REFERENCE TO MICROFICHE APPENDIX

N/A

BACKGROUND—FIELD OF INVENTION

This invention relates to a technique to accurately assess the performance of controllers applied to integrating processes. A common example of an integrating process is the level of a liquid surge vessel. Specifically, the technique compares the performance of the current control to what would be stained if an optimal controller for integrating processes was applied to the process.

BACKGROUND—DISCUSSION OF PRIOR ART

An integrating process is one where any imbalance causes the system to continue changing until some constraint is reached. The most common example of this is a liquid surge vessel as shown in FIG. 1. This is called an integrating process because any discrepancy between the inlet and outlet flow will cause the liquid level in the vessel to rise or fall until the vessel if either full or empty (the process integrates the discrepancy over time). The purpose of this surge vessel is to dampen out the variation in the inlet flow by allowing the amount of liquid in the vessel to vary between upper and lower limits. A significant fraction of industrial processes are integrating, and controllers must be applied to these processes to keep them within constraints.

A major difference between the objectives of a controller on a non-integrating process and a controller on an integrating process is that the objective of the first controller is usually to maintain some measured value as close to a desired value at all times. In U.S. Pat. No. 5,838,561, a method is described for evaluating controllers where the purpose of the controller is to keep a process measurement at a desired value. In contrast, often the purpose of a controller on an integrating process is to use the capacity of the unit to dampen disturbances. For instance, the purpose of the surge vessel level controller in FIG. 1 is to let the level in the vessel rise and fall to attenuate short-term variations in the inlet flow, thus maintaining the outlet flowrate as smooth as possible. In more formal terms, the objective of the surge vessel level controller is to minimize the maximum rate of change of the outlet flow, subject to the level being maintained between specified upper and lower bounds.

This patent is concerned with measuring the effectiveness of controllers applied to integrating processes. There are techniques currently available for measuring controller performance on nonintegrating processes (Harris & Desborough, 1992; Harris, et al., 1999), but these are not applicable for measuring the effectiveness of controllers on integrating processes, as the objectives of these two types of controllers are very different. There are no patents or prior works addressing the measurement of performance for controllers applied to integrating processes.

Harris and Desborough (*Performance Assessment for Univariate Feedback Controllers*, Cdn. J. Chem. Eng., non-integrating process to a theoretical Minimum Variance controller (i.e., the best physically realizable linear controller for non-integrating processes), and can be calculated from routine operating data. This measure has become a standard in industry, and is termed the Harris Index. However, the objective of the Minimum Variance Controller (to keep the measurement (PV) as close as possible to a desired value (SP)) is wrong for this case, and the Harris Index does not provide the proper measure of controller performance for integrating processes.

The simplest and most direct technique of assessing controller performance is to calculate the variance between the measurement (PV) and the setpoint (SP), i.e., $$\sigma^2 = \frac{1}{n}\sum_{i=1}^{n}(PV-SP)^2 \qquad (1)$$

For surge vessels, the variance may be calculated for both the level and outlet flow. However, this measure is not much of practical use, as there is little guidance as to what are desirable variances. The variances are, moreover, almost totally dependent on the inlet flow variance which is in general not constant over different time periods.

The correct performance measure is a comparison between the actual outlet flow variance, and the outlet flow variance that would occur if some "optimal" controller were applied to the system. Mathematically, this is expressed similarly to the Harris Index as:

$$\eta = 1 - \frac{\sigma_{opt}^2}{\sigma_{act}^2} \qquad (2)$$

The term ohd act$^2$ is the actual flow variance, while the optimum variance $\sigma_{opt}^2$ is, for the purposes of this patent, the flow variance that would result if the optimal level control algorithm of McDonald et al. (*Optimal Averaging Level Control*, AIChE J., 1986), or similar variants, such as proposed by Wang and Cluett (*Tuning PID controllers for integrating processes*, IEE Proc.-Control Theory Appl, 1997) were applied to the system.

BRIEF SUMMARY OF THE INVENTION

Of concern in the present invention is to determine the performance of a controller on an integrating process using normal closed-loop operating data. Also of concern in the present invention is for the performance measure to reflect the specific objectives of controllers for integrating processes—i.e., the objectives of minimizing the rate of change of the manipulated variable (outlet flow in the above example) while keeping the controlled variable (level) between specified limits.

It is, therefore, a feature of the present invention to provide a method to determine the performance of a controller for integrating processes.

It is, also, a feature of the present invention that it only requires normal operating data to determine the controller performance.

Yet another feature of the present invention is that the performance measure adequately reflects the objectives of controllers for integrating processes.

It is also a feature of the present invention that it has the same range and interpretation as the Harris Controller Performance Index.

Additional features and advantages of the invention will be set forth in part inthe description which follows, and will in part be apparent from the description, or may be learned from practice of the invention.

The features and advantages of the invention may be realized by means of the combinations and steps pointed out in the appended claims.

DETAILED DESCRIPTION OF THE INVENTION

Figure 1:
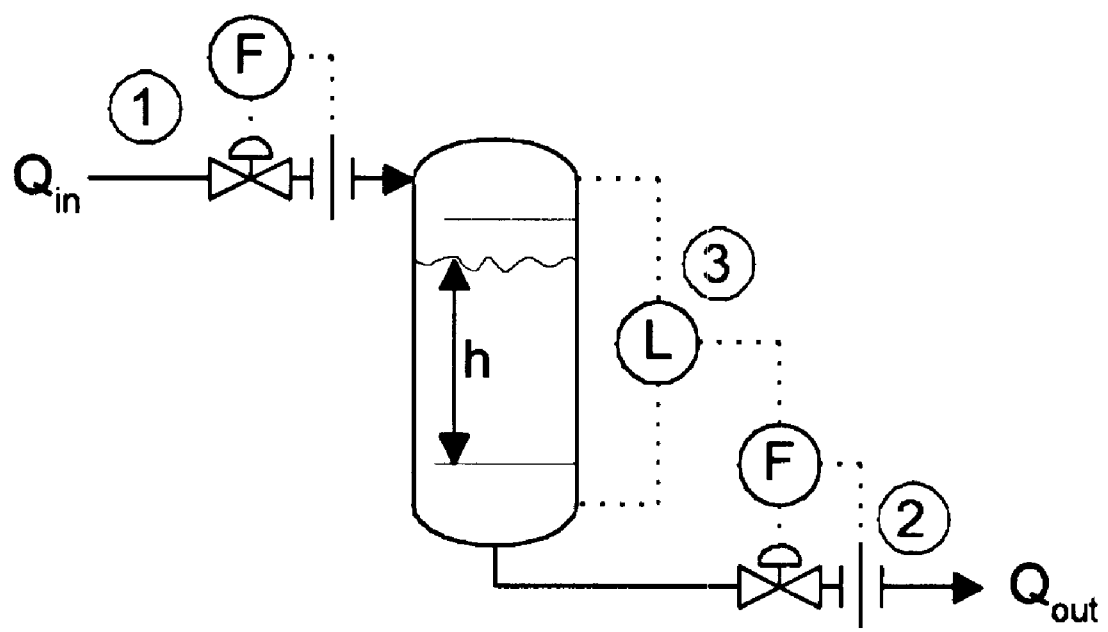
FIG. 1. Surge Vessel. The level controller (L) sets the desired flow to the flow controller (F) so that the level remains within upper and lower limits and inlet flow disturbances are attenuated.

The assessment of controller performance for integrating processes requires a set of historical data of three measurements: the inlet flow 1, the outlet flow 2, and the level or volume 3. If one of these measurements is unavailable, it may be estimated by a simple mass balance. Using the liquid surge vessel of FIG. 1 as an example:

$$A\frac{dh}{dt} = Q_{in} - Q_{out} \quad (3)$$

Here A is the surface area of the liquid, dh/dt is the derivative of the liquid height with respect to time, $Q_{in}$ is the inlet flow rate, and $Q_{out}$ is the outlet flow rate.

According to McDonald et al. (1986) the outlet flow which has the smallest maximum rate of change and maintains the level in the vessel between limits $h_{min}$ and $h_{max}$ is:

$$\frac{dQ'_{out}}{dt} = \frac{(Q_{in} - Q'_{out})^2}{2A(h_m - h)} \quad h_m = \begin{cases} h_{max} & \text{for } Q_{in} \geq Q'_{out} \\ h_{min} & \text{for } Q_{in} \leq Q'_{out} \end{cases} \quad (4)$$

Here $Q'_{out}$ is the optimal outlet flow if the above equation is used $h_{max}$ is the maximum desired level, and $h_{min}$ is the minimum desired level. Three quantities must be specified to determine the optimum outlet flow series: the inlet flow rate data series, the vessel surface area, and upper and lower vessel level limits. Equation 4 may then be used to calculate the outlet flow for each value of the inlet flow such that the maximum rate of change of the outlet flow is minimized and the level never exceeds any limits.

Once the optimal outlet flow $Q'_{out}$ data series has been calculated, the variance of both the actual outlet flow series $Q_{out}$ and the optimal outlet flow series $Q'_{out}$ may be calculated, and Equation 2 may be used to calculate the performance index.

Figure 2:
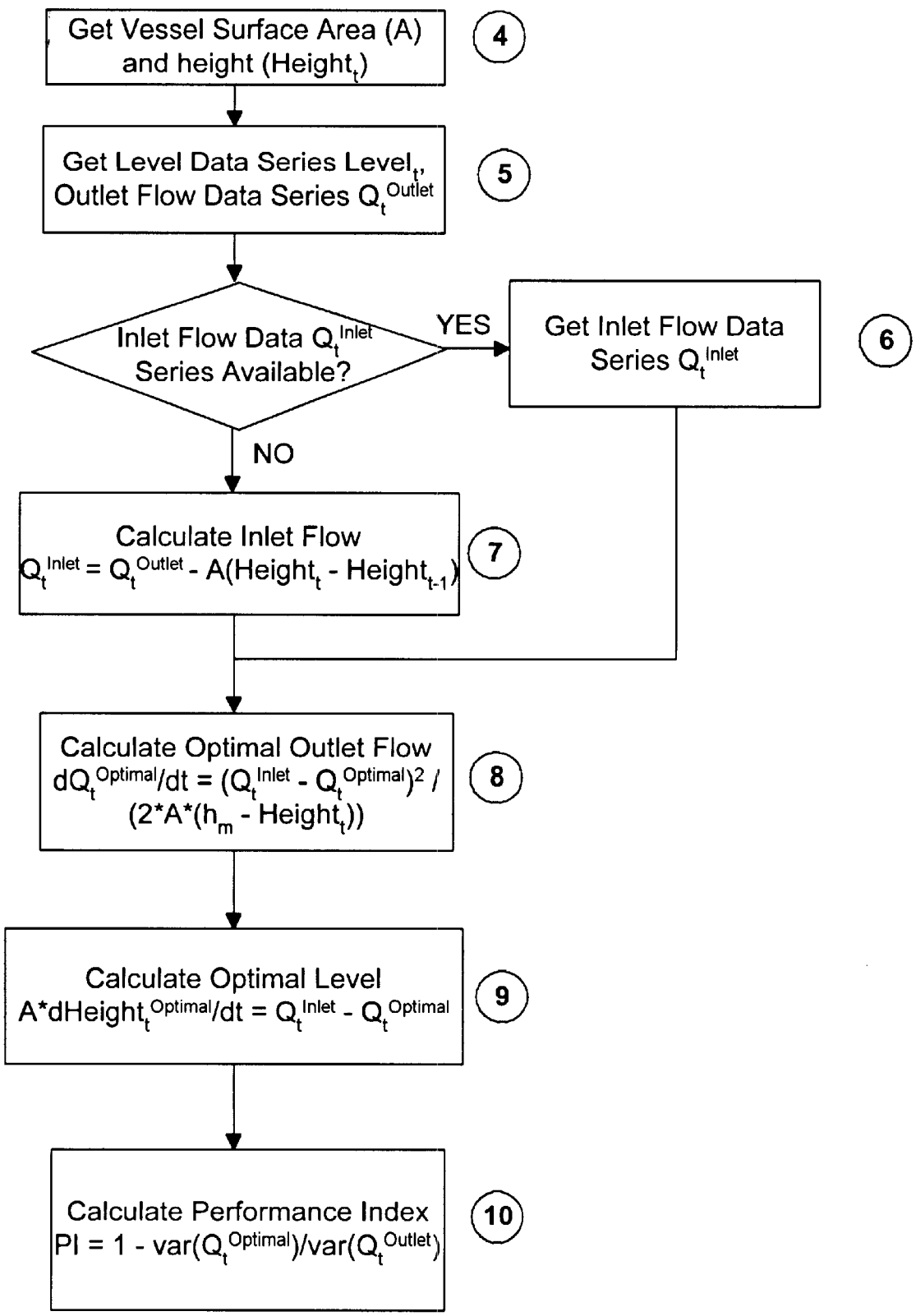
FIG. 2. Flow chart for the methodology of this patent. In this case, it is assumed that the outlet flow is used to control the level; a corresponding flow chart could be generated if the inlet flow is used to control the level.
Figure 3:
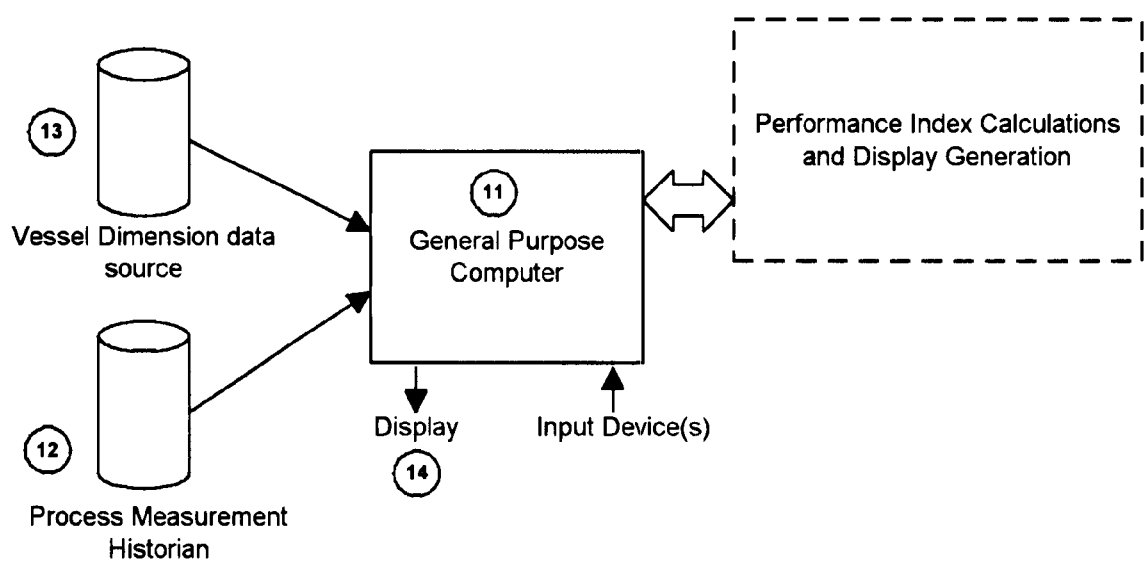
FIG. 3. Apparatus for calculating the methodology of this patent and displaying the subsequent results.

The calculations are performed as follows (see FIG. 2). First, the static values of the surface area and maximum and minimum heights are obtained 4, either from a user or from a storage device. A data set representing the height of liquid in the vessel and the outlet flow rateover a representative time period is also obtained 5, generally from a computer file or database. If an inlet flow data series is available, it is obtained 6, otherwise it is generated using Equation 3 7. An optimal outlet flow data series, which represents the outlet flow in an optimal controller, such as that given by Equation 4 is then generated 8. The optimal level that would occur if the optimal controller were applied may optionally be calculated 9. Finally, the performance index, which represents the ratio between the current output flow variance and the optimal output flow variance, may be calculated 10 using a standard formula for estimates of the variance.

The calculations are generally performed on a general purpose computer 11 that has the ability to access the process measurements 12, and has general input and output devices. The vessel dimensions and maximum and minimum capacities may be obtained from a storage device 13 or input from the user. The output from the algorithm may be displayed to the user in numerical or graphical form 14.

Note that the above formulation assumes that the inlet flow is independent, and the outlet flow is controlled to maintain vessel level. The algorithm may also be formulated in the same way, with no loss of generality, with the outlet flow as independent, and the inlet flow used to maintain the vessel level. Note also that the algorithm is presented for level control, but may be modified for other integrating processes as well.

Additional Embodiments
1) Feedforward controllers and setpoint change models may be incorporated into the analysis.
2) The simulated optimal outlet flow $Q'_{out}$ may be calculated by other control algorithms that have desirable characteristics.
3) Other metrics other than variance may be used to determine the characteristics of the data series.
4) Vessel level or inlet flow may also be used to calculate the performance metric.
5) The performance index (Equation 2) may be defined differently by suitable algebraic manipulations.
6) The performance measurement may be extended to the time and frequency domain.

What is claimed is:

1. A novel system of determining the performance of controllers applied to integrating processes comprising:
    a) first steps for retrieving a historical record of past outlet (inlet) flow data series, past process volume data series and vessel dimensions
    b) second steps for calculating actual inlet (outlet) flow data series given the said actual volume data series, said vessel dimensions, and actual said outlet (inlet) flow data series, if the actual inlet (outlet) flow data series is unavailable;
    c) third steps for calculating an optimal outlet (inlet) flow data series which maximally attenuates the variation in said actual inlet (outlet) flow data series using the capacity of the vessel;
    d) fourth steps of calculating an optimal volume data series from said optimal outlet (inlet) flow data series;
    e) fifth steps for determining variation of the said actual outlet (inlet) flow data series and said actual volume data series, and variation of said optimal outlet (inlet) flow data series and said optimal volume data series;
    f) sixth, novel steps for comparing the said variation in actual outlet (inlet) flow data series or said variation in actual volume data series to said variation in optimal outlet (inlet) flow data series or said variation in optimal volume data series.

* * * * *